(12) United States Patent
Kim et al.

(10) Patent No.: US 12,502,457 B2
(45) Date of Patent: Dec. 23, 2025

(54) HEMOSTATIC DRESSING AND METHOD FOR MANUFACTURING THE SAME

(71) Applicant: INNOTHERAPY INC., Seoul (KR)

(72) Inventors: Soo Mi Kim, Daejeon (KR); Mi Young Koh, Seoul (KR); Hong Kee Kim, Goyang-si (KR); Keum Yeon Kim, Seoul (KR); Moon Sue Lee, Seoul (KR)

(73) Assignee: INNOTHERAPY INC., Seoul (KR)

( * ) Notice: Subject to any disclaimer, the term of this patent is extended or adjusted under 35 U.S.C. 154(b) by 588 days.

(21) Appl. No.: 17/800,841

(22) PCT Filed: Oct. 19, 2020

(86) PCT No.: PCT/KR2020/014248
§ 371 (c)(1),
(2) Date: Aug. 18, 2022

(87) PCT Pub. No.: WO2021/177536
PCT Pub. Date: Sep. 10, 2021

(65) Prior Publication Data
US 2023/0285628 A1    Sep. 14, 2023

(30) Foreign Application Priority Data

Mar. 2, 2020 (KR) ........................ 10-2020-0025776

(51) Int. Cl.
*A61L 24/00* (2006.01)
*A61L 24/04* (2006.01)
*A61L 24/10* (2006.01)

(52) U.S. Cl.
CPC ......... *A61L 24/0036* (2013.01); *A61L 24/046* (2013.01); *A61L 24/102* (2013.01); *A61L 24/104* (2013.01); *A61L 2400/04* (2013.01)

(58) Field of Classification Search
CPC .. A61L 24/0036; A61L 24/046; A61L 24/102; A61L 24/104; A61L 2400/04
See application file for complete search history.

(56) References Cited

U.S. PATENT DOCUMENTS

| 3,438,374 | A | 4/1969 | Falb et al. |
| 2008/0195170 | A1* | 8/2008 | Asgari ............... A61L 27/56 607/36 |
| 2009/0155342 | A1 | 6/2009 | Diegelmann et al. |
| 2011/0251574 | A1 | 10/2011 | Hedrich et al. |
| 2014/0112973 | A1* | 4/2014 | Steinberg .......... A61P 3/10 424/443 |
| 2016/0317697 | A1 | 11/2016 | Hedrich et al. |
| 2017/0216485 | A1 | 8/2017 | Wang et al. |

FOREIGN PATENT DOCUMENTS

| CN | 104013990 A | 9/2014 |
| CN | 109620999 A | 4/2019 |
| JP | 2013523296 A | 6/2013 |
| KR | 20090077759 A | 7/2009 |
| KR | 20120116961 A | 10/2012 |
| KR | 20130055847 A | 5/2013 |
| KR | 20130091636 A | 8/2013 |
| KR | 101818229 B1 | 1/2018 |
| RU | 2599033 C2 | 10/2021 |

OTHER PUBLICATIONS

International search report of PCT/KR2020/014248, Jan. 27, 2021, English translation.
Huimin Geng et al., Mussel-Inspired Hydrogels for Tissue Healing, ACTA CHIMICA SINICA, 2020, vol. 78, pp. 105-113, Shanghai Institute of Organic Chemistry, Chinese Academy Sciences, Shanghai, China.
Russia Search report of 20221243337, Feb. 2, 2023.

* cited by examiner

*Primary Examiner* — Shirley V Gembeh
(74) *Attorney, Agent, or Firm* — STIP Law Group, LLC

(57) ABSTRACT

Provided is a hemostatic dressing. The hemostatic dressing includes: a porous matrix layer including a biocompatible polymer; a hemostatic layer loaded on the porous matrix layer and including a polymer in which polyhydric phenol-containing moieties are introduced; and a binding layer interposed between the porous matrix layer and the hemostatic layer to prevent the porous matrix layer from being separated from the hemostatic layer.

9 Claims, 3 Drawing Sheets

[FIG. 1]
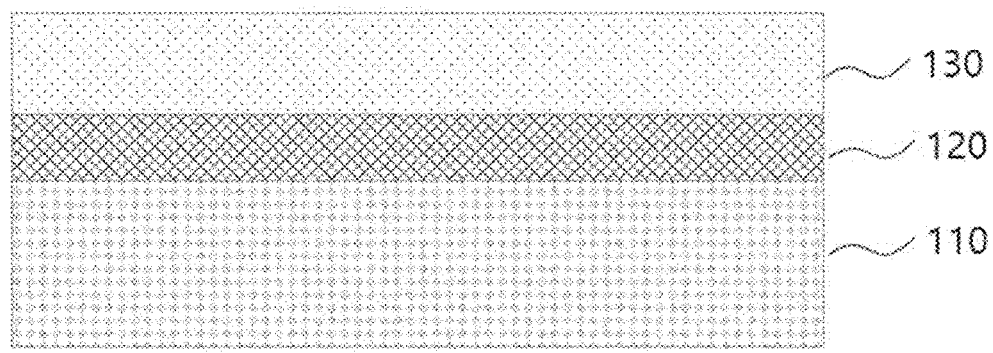
[FIG. 2]
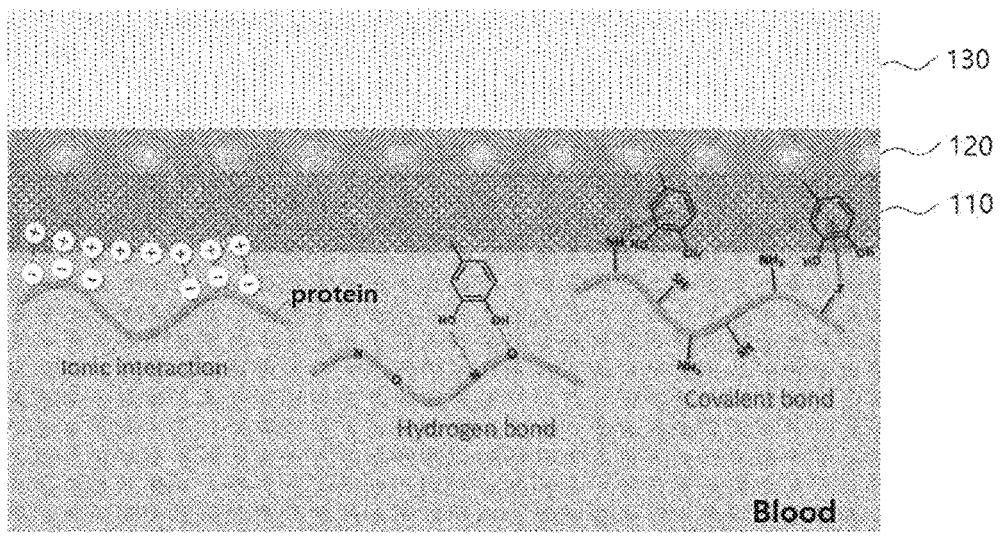

[FIG. 3(a)] [FIG. 3(b)]
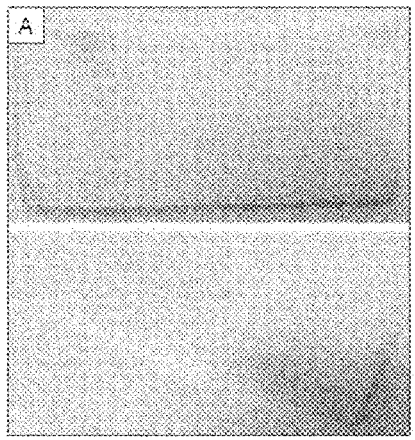
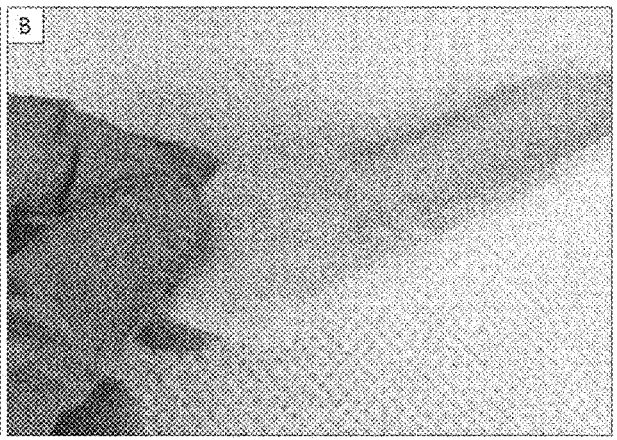
[FIG. 4]
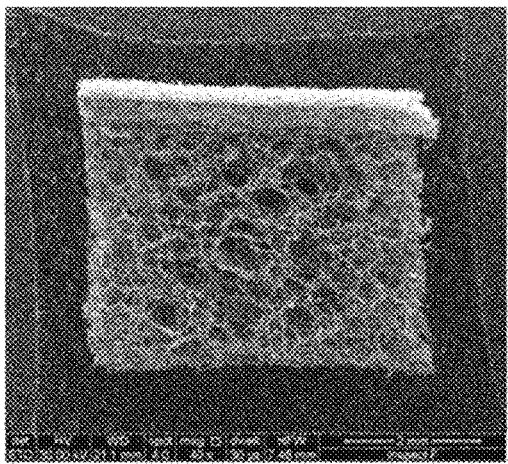
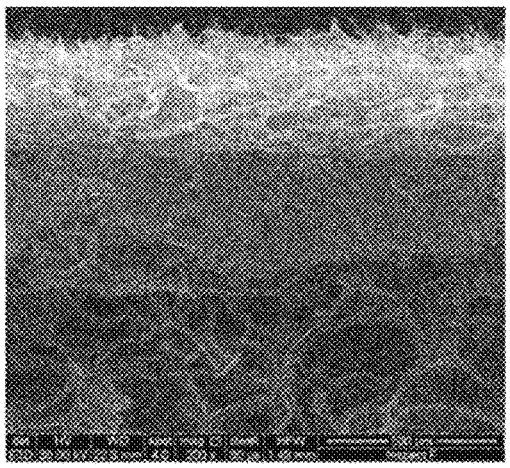

[FIG. 5(a)] [FIG. 5(b)]
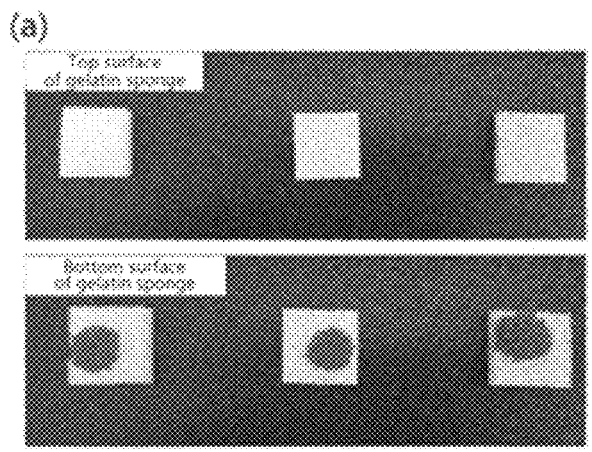
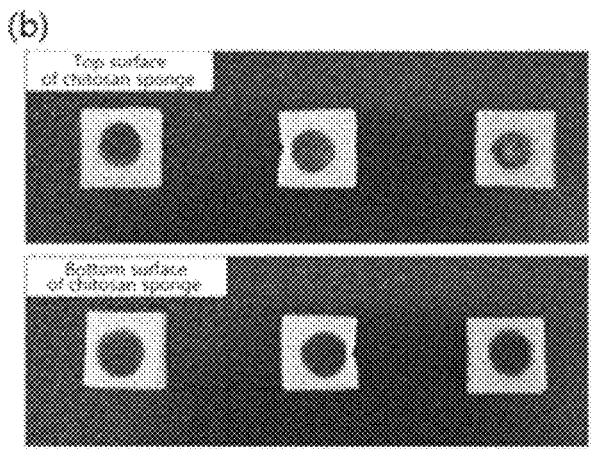
[FIG. 5(c)]
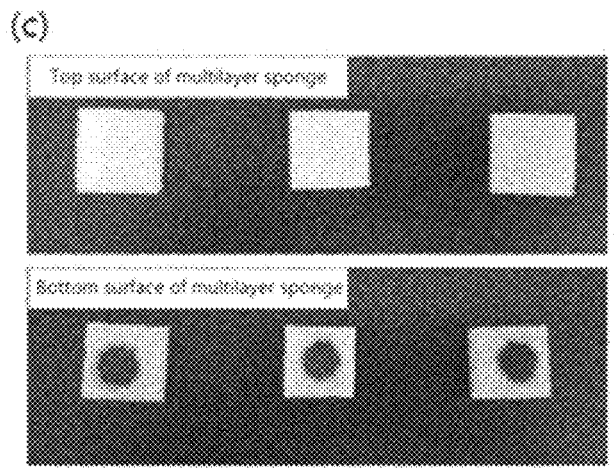

HEMOSTATIC DRESSING AND METHOD FOR MANUFACTURING THE SAME

CROSS-REFERENCE TO RELATED APPLICATIONS

This application is the U.S. National Phase under 35 U.S.C. § 371 of International Application No. PCT/KR2020/014248 filed on Oct. 19, 2020, which in turn claims the benefit of Korean Application No. 10-2020-0025776 filed on Mar. 2, 2020, the disclosures of which are incorporated by reference into the present application.

TECHNICAL FIELD

The present disclosure relates to a hemostatic dressing and a method for manufacturing the same. More specifically, the present disclosure relates to a hemostatic dressing with improved hemostatic performance, adhesion performance, sealing performance, and absorption performance and a method for manufacturing the hemostatic dressing.

BACKGROUND ART

Today's surgical techniques have made great advances but hemostatic techniques for stopping intrasurgical bleeding are still at an early stage of development. The primary goal of hemostatic agents is to stop bleeding. Hemostatic agents are required to have many functions for their proper use. Specifically, hemostatic agents should have the function of stopping bleeding. Hemostatic agents should be fixedly attached to desired tissue sites where hemostasis is needed, such that their hemostatic function is fulfilled. Hemostatic agents should have the additional functions of absorbing blood and reducing blood loss.

Many hemostatic agents are widely known and currently commercially available. Such hemostatic agents include fibrin-based hemostatic agents using fibrin at the final stage of the blood clotting mechanism of the body, cyanoacrylate-based hemostatic agents based on the same components and principle as those of instant adhesives to induce hemostasis (see, for example, Korean Patent Publication No. 2009-0077759), and hemostatic agents composed of natural polymer materials such as chitosan, gelatin, and collagen to act as physical barriers for hemostasis. However, the fibrin-based hemostatic agents have a risk of disease infection with ingredients derived from the living body and are difficult to apply to patients who take anticoagulants for hemostasis. The cyanoacrylate-based hemostatic agents produce toxic substances such as formaldehyde when degraded in vivo. The hemostatic agents composed of natural polymer materials do not have better hemostatic performance and lower adhesive strength to living tissues than expected. Further, some of the polymers are inferior in sealability and absorbency.

Blood-insoluble sponge-like structures are known as medical products for hemostasis. These medical products absorb blood from bleeding sites and stop bleeding based on the in vivo blood coagulation mechanism. The medical products are convenient to use because they do not adhere to surgical instruments due to the lack of adhesiveness. The medical products can seal blood from bleeding sites due to their ability to absorb blood. However, the medical products require a separate means for their close contact with tissues at bleeding sites because they do not tend to adhere to living tissues. Another disadvantage is the poor hemostatic performance of the medical products.

Another known medical product for hemostasis is a blood-soluble membrane structure. Upon contact with blood from a bleeding site, the medical product is dissolved to form a physical film on the bleeding site and adheres to the bleeding site. Based on this mechanism, the medical product achieves hemostasis. Due to its adhesive function, the medical product eliminates the inconvenience of using a separate means for adhesion to a living tissue. The medical product has the advantage of excellent hemostatic performance but it tends to stick to surgical instruments, causing inconvenience in use, and cannot seal blood from a bleeding site.

DETAILED DESCRIPTION OF THE INVENTION

Means for Solving the Problems

According to one aspect of the present disclosure, there is provided a hemostatic dressing including: a porous matrix layer including a biocompatible polymer; a hemostatic layer loaded on the porous matrix layer and including a polymer in which moieties containing a benzene ring having one or more hydroxyl groups are introduced; and a binding layer interposed between the porous matrix layer and the hemostatic layer to prevent the porous matrix layer from being separated from the hemostatic layer.

According to another aspect of the present disclosure, there is provided a method for manufacturing a hemostatic dressing. In one embodiment, the method includes (a) dissolving a polymer including phenol- or polyhydric phenol-containing moieties introduced therein in water to prepare a hemostatic layer-forming solution, (b) providing a porous matrix composed of a biocompatible polymer, (c) bringing the hemostatic layer-forming solution into contact with the surface of the porous matrix such that the hemostatic layer-forming solution is impregnated into the pores of the porous matrix, and (d) drying the hemostatic layer-forming solution to simultaneously form a hemostatic layer on the surface of the porous matrix and a binding layer at the interface between the porous matrix and the hemostatic layer.

BRIEF DESCRIPTION OF THE DRAWINGS

FIG. 1 is a schematic cross-sectional view illustrating one embodiment of a hemostatic dressing.

FIG. 2 is a schematic diagram illustrating a process for hemostasis and blood sealing when a hemostatic dressing according to one embodiment is applied to a bleeding site.

FIG. 3(*a*) and FIG. 3(*b*) shows the structures of a hemostatic multilayer sponge fabricated by impregnating a chitosan-catechol solution having a low viscosity into a gelatin layer and a hemostatic multilayer sponge fabricated by impregnating a chitosan-catechol solution having a high viscosity into a gelatin layer.

FIG. 4 shows cross-sectional scanning electron microscopy images of a multilayer sponge.

FIG. 5(*a*), FIG. 5(*b*) and FIG. 5(*c*) shows photographs revealing the results of analyzing the sealing properties of hemostatic sponges.

MODE FOR CARRYING OUT THE INVENTION

Unless otherwise defined, all technical and scientific terms used herein have the same meaning as commonly understood by one of ordinary skill in the art to which this invention belongs. Generally, the nomenclature used herein and in the following is well-known and commonly used in the art.

Various embodiments disclosed herein will now be described in more detail with reference to the accompanying drawings.

One aspect of the present disclosure provides a hemostatic dressing. FIG. 1 is a schematic cross-sectional view illustrating one embodiment of the hemostatic dressing. Referring to FIG. 1, the hemostatic dressing 100 includes: a porous matrix layer 110 including a biocompatible polymer; a hemostatic layer 130 loaded on the porous matrix layer 110 and including a polymer in which polyhydric phenol-containing moieties are introduced; and a binding layer 120 interposed between the porous matrix layer 110 and the hemostatic layer 130 to prevent the porous matrix layer 110 from being separated from the hemostatic layer 130.

The porous matrix layer 110 may be in the form of a woven fabric, a nonwoven fabric, a foamed polymer or a sponge. The porous matrix layer 110 may be in contact with an injury site such as a bleeding site and may have a plurality of pores to accommodate body fluids absorbed. The porous matrix layer 110 can retain blood, exudates, and other fluids introduced thereinto to prevent them from overflowing the injury site, achieving hemostasis. The matrix is preferably composed of a biocompatible polymer that is appropriately elastic and has good wettability and absorbency for liquids such as blood. The pores may be interconnected to each other in the matrix to form a three-dimensional structure.

The biocompatible polymer is preferably a material that can be absorbed in vivo over time through enzymatic degradation, biological degradation or hydrolysis after being applied in vivo.

The biocompatible polymer is preferably a blood-insoluble material. Particularly, the biocompatible polymer is insoluble in water at a neutral pH at around 37° C., which are in vivo conditions. The biocompatible polymer is biodegraded within 3 months, preferably within 8 weeks after being applied in vivo. It is preferable that the biocompatible polymer is naturally degraded within the above period after the desired purpose is achieved following wound closure.

The biocompatible polymer may be a natural or synthetic biodegradable polymer. Specifically, the natural biodegradable polymer may be selected from the group consisting of collagen, fibronectin, fibrin, gelatin, elastin, chitin, chitosan, starch, dextrose, dextran, alginic acid, hyaluronic acid, cellulose, derivatives thereof, and copolymers thereof. Specifically, the synthetic biodegradable polymer may be selected from the group consisting of poly(lactic acid) (PLA), poly(glycolic acid) (PGA), poly(D,L-lactide-co-glycolide) (PLGA), poly(ε-caprolactone) (PCL), polyhydroxyalkanoate, polyanhydride, polyorthoester, polyamine, derivatives thereof, and copolymers thereof. The aforementioned biodegradable polymers are provided for illustrative purposes only. Any polymer including a hydrolysable backbone such as an amide, aliphatic ester, urea, urethane, ether or peptide backbone may be used without particular limitation.

The derivatives of the biocompatible polymers may be salts of the biocompatible polymers. Alternatively, the derivatives of the biocompatible polymers may be modification products formed by substitution or modification of functional groups (for example, —OH, —SH, —NH$_2$, —COOH or —NHC(O)CH$_3$) of the biocompatible polymers with other hydrophilic groups or other biocompatible polymers or salts of the modification products.

The matrix including the biocompatible polymer may be, for example, a gelatin or collagen pad that causes less inflammatory response and provides excellent biofunctionality and biodegradability after in vivo transplantation. Gelatin and collagen pads are degraded at the high rate mentioned above due to the action of proteases abundantly expressed in corresponding tissues after hemostasis. The matrix has the primary hemostatic effect of the biocompatible polymer. The secondary hemostatic effect of the matrix is due to the absorption of body fluids and the effective compression of the expanding matrix. In addition, the matrix has excellent sealing performance.

The biocompatible polymer may be a crosslinked or uncrosslinked one. The biocompatible polymer preferably has a crosslinked structure that is not dissolved in water and can maintain its shape even when exposed to blood. The biocompatible polymer may form a porous structure that can absorb blood while maintaining its shape. The porous structure can impart blood sealability to the matrix.

The biocompatible polymer can be prepared from a fibrous, powdery or liquid raw material that can be processed into a porous matrix. The preparation of the biocompatible polymer may involve acidification at a pH of 1.5-4 and neutralization with an alkaline solution. The porous matrix using the biocompatible polymer may be prepared by freeze-drying a gel, suspension or solution of the biocompatible polymer. The matrix may be crosslinked by mixing the raw material with a crosslinking agent in an organic solvent and polymerizing the raw material. The crosslinking agent may be, for example, glutaraldehyde, formaldehyde, acetaldehyde, ethylene formaldehyde, acetaldehyde or ethylene isopropanol.

The thickness of the porous matrix layer 110 is not particularly limited but is 1 to 20 millimeters (mm), preferably 1 to 15 millimeters. If the thickness is less than the lower limit, the porous matrix layer cannot serve as a sufficient absorption barrier to blood. Meanwhile, if the thickness exceeds the upper limit, it may take a very long time for in vivo degradation.

The hemostatic layer 130 exists as a separate layer from the porous matrix layer 110 and may be stacked with the porous matrix layer 110 via the binding layer 120 without being separated from the porous matrix layer 110. The hemostatic layer 130 includes a polymer in which moieties containing a benzene ring having one or more hydroxyl groups (i.e. phenol- or polyhydric phenol-containing moieties) are introduced. The moieties containing a benzene ring are polyhydric phenol-containing moieties, which are preferable in terms of hemostatic performance and adhesion performance. The polyhydric phenol refers to a benzene ring having two or more hydroxyl groups (—OH). The polyhydric phenol is preferably catechol having two hydroxyl groups (—OH) or gallol having three hydroxyl groups (—OH). In some embodiments, some of the hydrogen atoms of the phenol or polyhydric phenol may be replaced with other hydrophilic functional groups.

The polymer is preferably a biocompatible polymer. The biocompatible polymer may be a natural or synthetic biodegradable polymer. Specifically, the biocompatible polymer is the same as that described above for the polymer used in the porous matrix layer 110.

The polymer may be selected from the group consisting of gelatin, collagen, fibrin, elastin, hyaluronic acid, alginic acid, alginate, carboxymethyl cellulose, carboxyethyl cellulose, hydroxymethyl cellulose, fibrin, heparin, chitin, chitosan, and derivatives thereof, which are preferred taking into consideration hemostatic performance, biodegradability, and tissue regeneration effect.

The phenol-containing moieties or the polyhydric phenol-containing moieties such as catechol or gallol may be connected to the side chains or ends of the polymer backbone, for example, through functional groups such as —NH$_2$, —SH, —OH or —COOH. The phenol- or polyhydric phenol-containing moiety may be represented by "phenol-L-" or "polyhydric phenol-L-" where L may be a single bond, a C$_1$-C$_{10}$ aliphatic hydrocarbon chain optionally containing —O—, —S—, —NH—, —C(O)—, —C(O)O—, —OC(O)O— or —C(O)NH— or a C$_3$-C$_{10}$ alicyclic hydrocarbon chain optionally containing —O—, —S—, —NH—, —C(O)—, —C(O)O—, —OC(O)O— or —C(O)NH—.

Typically, the phenol- or polyhydric phenol-containing moieties may be conjugated to the biocompatible polymer by a reaction between the functional groups of the biocompatible polymer and end groups of a phenol- or polyhydric phenol-containing compound. The reaction may be introduced by various approaches such as chemical synthesis, electrochemical synthesis, and enzymatic synthesis.

The phenol- or polyhydric phenol-containing moieties may be present in an amount of 1 to 50 mol %, 1 to 40 mol %, 1 to 30 mol % or 2 to 25 mol %, based on the total moles of the repeating units in the biocompatible polymer. If the content of the phenol- or polyhydric phenol-containing moieties is less than the lower limit, low blood solubility and poor hemostatic performance and adhesion performance may be caused. Meanwhile, if the content of the phenol- or polyhydric phenol-containing moieties exceeds the upper limit, catechol may be oxidized.

Various materials are suitable for the hemostatic layer 130. Reaction Schemes 1 and 2 show synthetic methods for chitosan polymers in which catechol-containing moieties are introduced by a reaction between a chitosan polymer and a catechol-containing compound.

[Reaction Scheme 1]

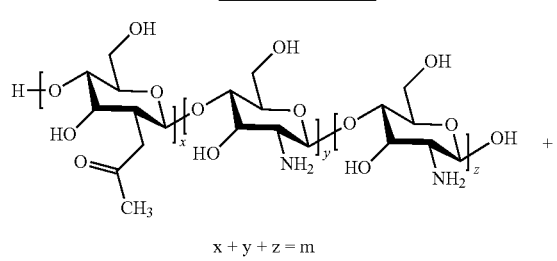

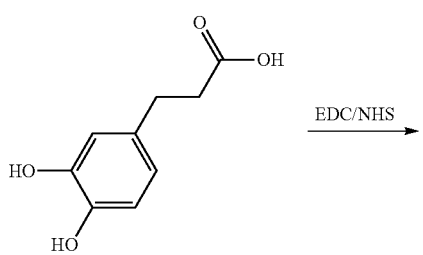

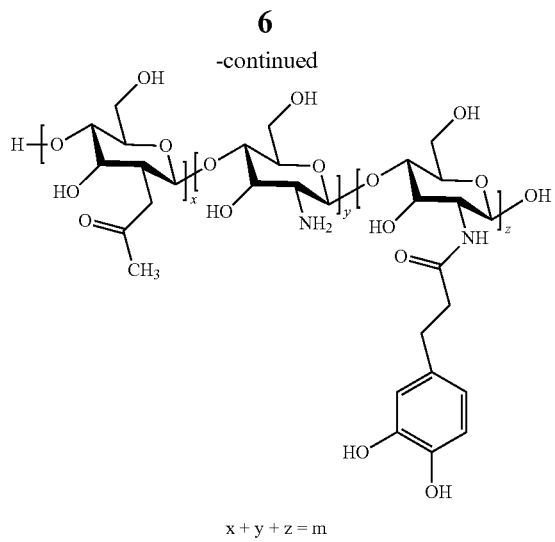

[Reaction Scheme 2]

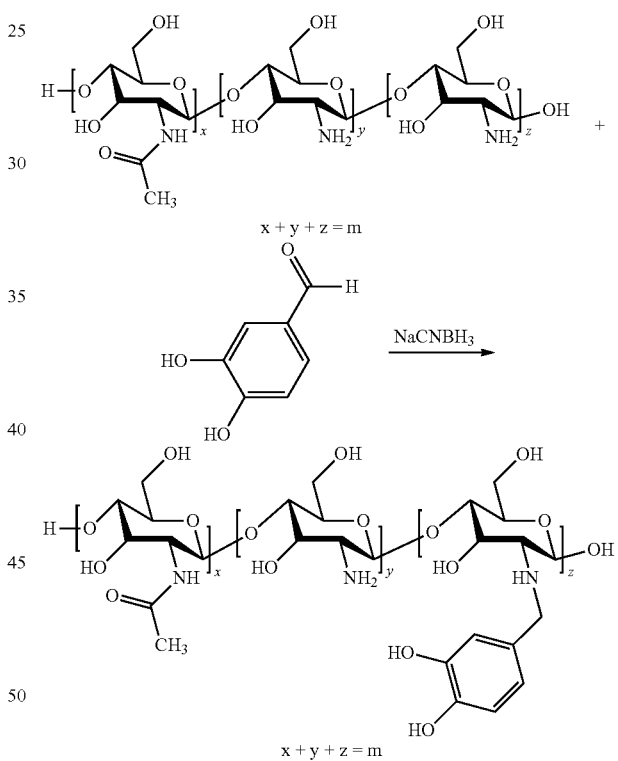

wherein x, y and z are all integers and m is an integer from 50 to 6,000.

Reaction Scheme 1 shows the formation of amide moieties by carbodiimide coupling, where a carboxylic acid-terminated catechol such as 3,4-dihydroxyhydrocinnamic acid (i.e. hydrocaffeic acid) is conjugated to amine groups of the chitosan backbone. The reaction is carried out at a pH of 5 to 6 to prevent catechol oxidation. A protonic solvent such as ethanol is used to prevent the precipitation of water-insoluble chitosan during the reaction. As a result of this amide coupling, the catechol is usually introduced into the polymer backbone with a degree of substitution of 4 to 30 mol % with respect to the amine groups. The catechol may be introduced with a degree of substitution of 80 mol % or more by the reaction for a prolonged time of several days.

Reaction Scheme 2 shows a reductive amination reaction, where an aldehyde-terminated catechol such as 3,4-dihydroxybenzaldehyde reacts with amine groups of the chitosan backbone and the resulting imine bonds (—C=N—) are reduced to —C—N— bonds using a reducing agent such as NaBH$_4$. As a result of this reductive amination, the catechol can be introduced into the polymer backbone with a degree of substitution of 18 to 80 mol % in a short time.

A material that is dissolved upon contact with blood and forms a gel may be used for the hemostatic layer. Such materials include chitosan-catechol, hyaluronic acid-catechol, gelatin-catechol, collagen-catechol, polyamine-catechol, chitosan-gallol, hyaluronic acid-gallol, gelatin-gallol, collagen-gallol, and polyamine-gallol.

Among the above various polymers, for example, polymeric compounds such as chitosan are known to stop bleeding. Specifically, positively charged —NH$_3^+$ in chitosan attracts negatively charged platelets in blood, and as a result, the platelets rapidly aggregate, achieving rapid hemostasis. However, since this feature is limited to an extremely acidic environment of pH 2, chitosan substantially lacks hemostatic capacity in the living body close to a neutral environment (pH 7). However, the polymer used in the hemostatic layer of the hemostatic dressing according to the present disclosure is modified with a polyhydric phenol such as catechol or gallol so as to have adhesive properties even in a neutral aquatic environment such as blood. As a result, the modified polymer is dissolved in blood, and after a while, it has an electrical attractive force with erythrocytes to form a hemostatic film on the bleeding tissue site. The hemostatic film is maintained for several days and can be naturally degraded by enzymes in the body.

Due to the presence of the aromatic and —OH groups in the phenol or polyhydric phenol, the solid hemostatic layer 130 may be easily dissolved in blood and be then gelled. The hemostasis and adhesion mechanism of the hemostatic layer 130 can be explained in various ways. The hemostatic layer 130 enables rapid and strong hemostasis and adhesion to a tissue through π-π interaction between aromatic groups, hydrogen bonding, and coordination bonding with metal ions or cation-π bonding between metal ions and aromatic rings without the need to use a separate special crosslinking agent or apply ultraviolet or thermal energy.

In a preferred embodiment, the hemostatic layer 130 may include both phenol- or polyhydric phenol-containing moieties and their oxidized forms. As a result, benzene rings having —OH and benzene rings having =O may coexist in the polymer of the hemostatic layer 130. For example, the hydroxyl groups (—OH) of the catechol moieties

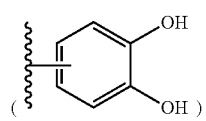

introduced in the polymer of the hemostatic layer 130 may be artificially or naturally oxidized during fabrication of the hemostatic dressing 100 to convert some of the catechol moieties to quinone moieties

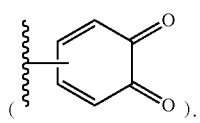

The quinone-containing moieties may react with —NH$_2$ present in organic materials such as tissue proteins, blood proteins or the polymer of the hemostatic layer dissolved in blood to form covalent bonds between the proteins and the catechol moieties. The formation of covalent bonds can further enhance the ability of the hemostatic layer to adhere to tissue and stop bleeding. After the covalent bonds are formed, the oxo groups (=O) of the quinone moieties are reduced to hydroxyl groups (—OH). The hydroxyl groups can maintain hydrogen bonds with nitrogen and oxygen atoms in organic materials. A quinone may react with an amine to form a covalent bond, for example, via Michael-type addition (Reaction Scheme 3) or Schiff base reaction (Reaction Scheme 4).

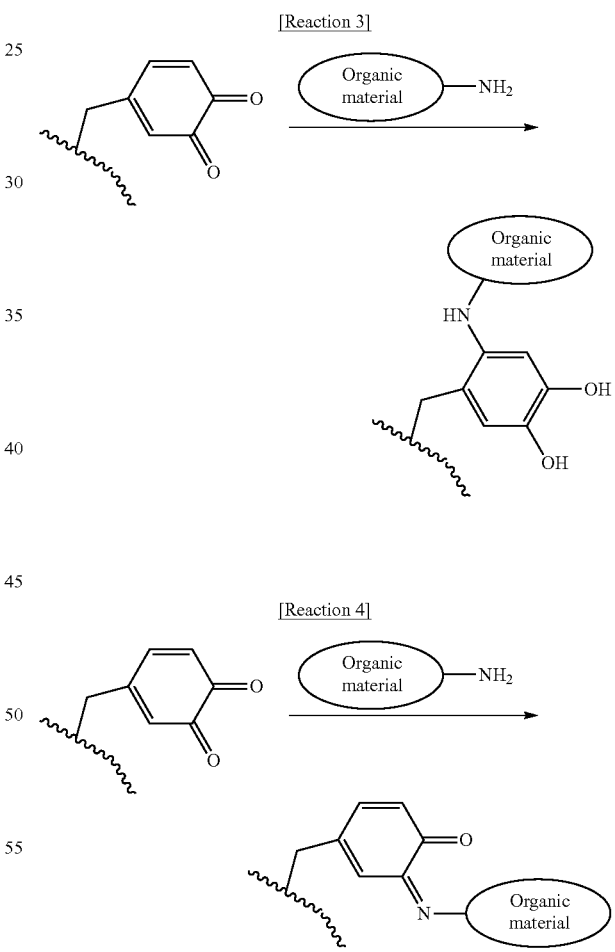

In one embodiment, the content of the oxidized moieties in the hemostatic layer 130 may be 50 mol % or less, preferably 40 mol % or less, more preferably 30 mol % or less, based on the total moles of the phenol- or polyhydric phenol-containing moieties and the oxidized moieties. The lower limit of the content of the oxidized moieties is preferably limited to 0.1 mol % or more. Within this range, the ability of the hemostatic layer 130 to adhere to tissue and stop bleeding can be optimized. As the content of the oxidized moieties increases, the number of strong bonds such as covalent bonds increases, as described above. From the viewpoint of rapid hemostasis, however, it is necessary to maintain a higher content of —OH. Thus, it is preferable to control the content of —OH to an appropriate range.

Although the binding mechanism by covalent bonding is slower than the above-described cation-π binding mechanism, it can induce a very strong adhesive strength to tissue protein. Accordingly, the ability of the hemostatic dressing 100 including the hemostatic layer 130 to stop bleeding and seal blood can be improved when the hemostatic dressing 100 is applied to a bleeding human tissue.

As the number of —OH groups bonded to one benzene ring in the phenol- or polyhydric phenol-containing moieties introduced in the biocompatible polymer increases, the probability of oxidation to quinone forms increases over time but the number of sites capable of interacting with foreign proteins increases, achieving improved hemostatic performance and adhesion performance.

The binding layer 120 is interposed between the porous matrix layer 110 and the hemostatic layer 130. The hemostatic dressing 100 has a multilayer structure in which the porous matrix layer 110 capable of absorbing blood is bound to the hemostatic layer 130 having hemostatic performance and adhesion performance. It is very important that the two layers are well bound to each other without being separated from each other during transport and use of the hemostatic dressing 100. However, since the water-soluble material for the porous matrix layer 110 and the water-insoluble material for the hemostatic layer 130 have different physical properties, it may be difficult to bind the two layers to each other without a separate adhesive. In order to prevent separation between the two layers, semi-finished products of the layers may be prepared and bound to each other with an additional adhesive. However, the use of an adhesive may be limited in terms of toxicity and process inefficiency.

The constituent components of the hemostatic layer 130 may be simply coated on the surface of the porous matrix layer 110 without using an additional adhesive. In this case, however, the two layers may not sufficiently interact with each other, resulting in poor adhesion therebetween. As a result, the two layers may be separated or detached from each other during transport and use of the hemostatic dressing 100, which seriously affects the quality of the final product.

Accordingly, the binding layer 120 serves to prevent the porous matrix layer 110 and the hemostatic layer 130 from being separated from each other. The binding layer 120 is preferably formed using a material that is miscible with the porous matrix layer 110 and the hemostatic layer 130. That is, the binding layer is formed using a material that can interact with various functional groups (for example, —OH, —NH$_2$, and —COOH) of the protein or polysaccharide for the porous matrix layer 110 and functional groups of the protein for the hemostatic layer 130 by hydrogen bonding or covalent bonding via condensation reactions. The material for the binding layer is preferably one derived from the constituent components of the porous matrix layer 110 and the hemostatic layer 130. For example, the material for the binding layer may be a blend or a copolymer of the major constituent component of the porous matrix layer 110 and the major constituent component of the hemostatic layer 130.

The binding layer 120 may be introduced in various ways. For example, the binding layer 120 may be introduced by laminating a film composed of the material for the binding layer between the two layers 110 and 130, coating the material for the binding layer on the porous matrix layer 110 or impregnating the material for the binding layer into the porous matrix layer 110.

In a preferred embodiment, the binding layer 120 may be formed by sufficiently impregnating the components for the hemostatic layer 130 into the porous matrix layer 110. As a result, the binding layer 120 may include a mixed region of the biocompatible polymer and the polymer including the phenol- or polyhydric phenol-containing moieties introduced therein. The liquid components of the hemostatic layer 130 penetrate deep into the porous matrix layer 110 during impregnation, so that the hydrophilic groups of the biocompatible polymer constituting the porous matrix layer 110 can strongly interact with the hydroxyl groups of the component of the hemostatic layer 130 by hydrogen bonding, allowing the binding layer 120 to perform its role. Therefore, the binding layer 120 can be formed using the constituent components of the layers 110 and 130 without a separate adhesive, avoiding the problems such as toxicity and poor biodegradability or bioabsorbability encountered in the use of an additional adhesive. The miscibility of the binding layer with the other layers 110 and 130 is also high enough to prevent the layers 110 and 130 from being separated from each other.

In one embodiment, a concentration gradient in which the concentration of the polyhydric phenol-containing moieties decreases in the direction from the hemostatic layer 130 to the porous matrix layer 110 composed of the biocompatible polymer may be established in the mixed region depending to how to form the binding layer 120. By the concentration gradient, the porous matrix layer 110 and the hemostatic layer 130 can be more strongly bound to each other via the binding layer 120 interposed therebetween.

The thickness of the binding layer 120 is not particularly limited and is typically 1 to 1,500 micrometers (μm), preferably 100 to 1200 micrometers, more preferably 200 to 1,000 micrometers. If the thickness of the binding layer 120 is less than the lower limit, the porous matrix layer and the hemostatic layer may be separated from each other. Meanwhile, if the thickness of the binding layer 120 exceeds the upper limit, the porous matrix layer may not be distinguished, resulting in deterioration of its absorption and sealing performance.

As described above, the presence of the binding layer ensures a sufficient bonding strength between the layers without problems caused by the use of an additional adhesive while maintaining the required physical properties of the constituent layers of the hemostatic dressing. The presence of the binding layer is also advantageous in achieving the desired product performance.

The hemostatic dressing of the present disclosure has the following advantageous effects. The binding of the hemostatic layer with adhesive properties and the porous matrix layer with sealing properties allows the hemostatic dressing to simultaneously have adhesive properties and sealing properties and enables the hemostatic dressing to adhere to a bleeding tissue site without an additional means while preventing the hemostatic dressing from sticking to surgical instruments during surgical operation. Therefore, the hemostatic dressing is convenient to use, has excellent hemostatic performance, and can seal blood from a bleeding site.

The use of fibrin-based hemostatic agents based on the blood clotting mechanism of the body is disadvantageous in that hemostasis cannot be induced for patients who take anticoagulants. In contrast, the hemostatic dressing of the present disclosure uses the polyhydric phenol-containing moieties that mimic 3,4-dihydroxyphenylalanin (DOPA), a mussel-derived protein, which exhibits excellent adhesive properties in water, achieving high adhesive strength to a bleeding site. Due to the presence of both aromatic rings and —OH functional groups in the polyhydric phenol-containing moieties, the hemostatic component binds to blood proteins by various binding mechanisms, including hydrogen bonding, strong coordination bonding with metals, covalent bonding, and cation-π bonding, rather than by the in vivo hemostatic mechanism, enabling the application of the hemostatic dressing to any patient and achieving rapid hemostasis.

The hemostatic layer and the porous matrix layer are not simply bound together but are bound to each other via the binding layer. The presence of the binding layer prevents the hemostatic layer and the porous matrix layer from being separated from each other during transport and use of the hemostatic dressing.

Particularly, the use of the polymer in which moieties containing a benzene ring having hydroxyl groups are introduced, for the hemostatic layer enables rapid hemostasis via a mechanism such as cation-π bonding. In addition, the coexistence of quinone-like moieties capable of covalent bonding with foreign proteins can achieve excellent hemostasis and strong adhesion simultaneously. The presence of the porous matrix layer firmly bound to the hemostatic layer by the binding layer allows the hemostatic dressing of the present disclosure to have the ability to absorb and seal blood as well as hemostatic performance and adhesion performance.

The hemostatic dressing of the present disclosure can be stored at room temperature for a long time and its quality is not changed even in a high-humidity environment, unlike conventional hemostatic products that should be transported under refrigerated conditions for their performance maintenance. After the hemostatic dressing of the present disclosure is applied in vivo to achieve the purposes of hemostasis and sealing, it is degraded into materials that are harmless to humans and absorbed in vivo. Therefore, the hemostatic dressing of the present disclosure is considered highly biocompatible.

FIG. 2 is a schematic diagram illustrating a process for hemostasis and blood sealing when the hemostatic dressing is applied to a bleeding site.

According to another aspect of the present disclosure, a method for manufacturing a hemostatic dressing is provided. In one embodiment, the method includes (a) dissolving a polymer including polyhydric phenol-containing moieties introduced therein in water to prepare a hemostatic layer-forming solution, (b) providing a porous matrix composed of a biocompatible polymer, (c) bringing the hemostatic layer-forming solution into contact with the surface of the porous matrix such that the hemostatic layer-forming solution is impregnated into the pores of the porous matrix, and (d) drying the hemostatic layer-forming solution to simultaneously form a hemostatic layer on the surface of the porous matrix and a binding layer at the interface between the porous matrix and the hemostatic layer.

In step (a), a polymer including polyhydric phenol-containing moieties introduced therein is dissolved in water to prepare a hemostatic layer-forming solution. The polymer is used in an amount of 0.1 to 3 parts by weight, based on 100 parts by weight of water. The hemostatic layer-forming solution has a viscosity of 10 to 2,500 cP, preferably 10 to 1,500 cP, more preferably 10 to 1,000 cP, as measured using a rotary viscometer at 4° C.

The hemostatic layer-forming solution having an appropriate viscosity in the range defined above can be well absorbed and impregnated into the porous matrix. If the viscosity is less than the lower limit, a binding layer having an excessively large thickness may be formed and the hemostatic layer-forming solution may be impregnated into the uppermost layer, resulting in disappearance of the porous matrix layer. Meanwhile, if the viscosity exceeds the upper limit, the porous matrix layer and the hemostatic layer may be separated from each other and a binding layer may not be formed.

The phenol- or polyhydric phenol-containing moieties may be introduced in the biocompatible polymer chain by a chemical synthesis, electrochemical synthesis or enzymatic synthesis method using a compound having a phenol, catechol or gallol moiety. In one embodiment, the biocompatible polymer is dissolved in distilled water under heating, reactants, including a phenol- or polyhydric phenol-containing compound, are added to the solution, and the mixture is stirred at a pH of 4 to 6.

For example, the hemostatic layer-forming solution including the polymer containing catechol moieties introduced therein is chemically prepared by the following procedure. First, a 1-hydroxy-2,5-pyrrolidinedione (NHS) solution is added to the polymer solution to prepare a polymer/NHS mixed solution and a 1-ethyl-3-(-3-dimethylaminopropyl)carbodiimide hydrochloride (EDC) solution is added to the polymer/NHS mixed solution to prepare a polymer/NHS/EDC mixed solution. Subsequently, a dopamine solution is added to and reacts with the polymer/NHS/EDC mixed solution to prepare the hemostatic layer-forming solution including the polymer containing catechol moieties introduced therein.

According to the method of the present disclosure, the reaction between the phenol- or polyhydric phenol-containing compound and the biocompatible polymer proceeds in an aqueous phase. During the reaction, the polyhydric phenol such as catechol is oxidized to quinone-like compounds by reaction with oxygen in water. The coexistence of catechol and quinone in the hemostatic layer leads to further improved adhesion performance and hemostatic performance.

Specifically, the compound having a phenol moiety introduced in the biocompatible polymer chain may be, for example, tyramine, L-tyrosine or phloretic acid. Specifically, the compound having a catechol or gallol moiety introduced in the biocompatible polymer chain may be, for example, pyrocatechol, L-dopa, dopamine, norepinephrine, caffeic acid, gallic acid, gallolamine or 2-aminoethane pyrogallol.

In step (c), the hemostatic layer-forming solution is brought into contact with the surface of the porous matrix. To this end, for example, the hemostatic layer-forming solution is dispensed into a PET mold, the porous matrix is arranged on top of the dispensed solution, and the hemostatic layer-forming solution is impregnated into the porous matrix under refrigerated conditions. As a result of the impregnation, a binding layer may be introduced between the porous matrix layer and a hemostatic layer. During the impregnation, the thickness of the binding layer is controlled to the range of 1 to 1,500 preferably 100 to 1,200 more preferably 200 to 1,000 Within this thickness range, the absorption and sealing performance of the porous matrix layer can be maintained at a high level.

In step (d), the hemostatic layer-forming solution is freeze-dried to form a solid hemostatic layer on the surface of the porous matrix. A binding layer may also be completely formed at the interface between the porous matrix and the hemostatic layer.

According to the method of the present disclosure, a hemostatic dressing having a multilayer structure consisting of a hemostatic layer, a binding layer, and a porous matrix layer can be fabricated in a simple manner by an impregnation process.

The hemostatic dressing fabricated by the method of the present disclosure is harmless to humans and has the functions of hemostasis, in vivo adhesion, and blood absorption and sealing. Therefore, the hemostatic dressing can be used to significantly improve the performance of existing polymer hemostatic agents. In addition, the hemostatic dressing is effective in stopping bleeding and can be applied to various fields where the prevention of organ perforation, bile leakage, and post-surgery adhesion is required. Furthermore, the hemostatic dressing is convenient to use because it does not stick to surgical instruments during use and its quality is not changed during transport because the components have no hydrolysable groups.

The present disclosure will be more specifically explained with reference to the following examples. It will be obvious to those skilled in the art that these examples are merely for illustrative purposes and the scope of the disclosure is not to be construed as being limited thereto.

EXAMPLES

Preparative Example 1: Synthesis of Gelatin-Catechol 300 mL of triple-distilled water was placed in a reactor and 3 g of gelatin, which has been previously divided into small portions, was added thereto. The mixture was dissolved with appropriate stirring under heating for at least 3 h to prepare a gelatin solution. Complete dissolution of the gelatin was confirmed by visual observation.

A solution of 1.12 g of 1-hydroxy-2,5-pyrrolidinedione ("NHS") in 15 mL of triple-distilled water was added to the stirred gelatin solution to prepare a gelatin-NETS solution. A solution of 1.87 g of 1-ethyl-3-(-3-dimethylaminopropyl) carbodiimide hydrochloride ("EDC") in 15 mL of triple-distilled water was added to the gelatin-NETS solution to prepare a gelatin-NETS-EDC solution. A solution of 1.23 g of dopamine in 15 mL of triple-distilled water was added to the gelatin-NHS-EDC solution to prepare a gelatin-NHS-EDC-dopamine solution. The reaction was carried out at room temperature for at least 5 h. After completion of the reaction, the reaction solution was dialyzed using a dialysis membrane (MWCO: 12,000-14,000, SpectraPor). The product was freeze-dried and stored.

2 mg of the resulting gelatin-catechol hemostatic sponge was dissolved in 1 mL of deionized water. The binding rate of catechol was confirmed using a UV-Vis spectrophotometer. As a result, the binding rate of catechol per gelatin molecule was found to be 3.3%.

Preparative Example 2: Synthesis of Hyaluronic Acid-Catechol 300 mL of triple-distilled water was placed in a reactor and 3 g of hyaluronic acid, which has been previously divided into small portions, was added thereto. The mixture was dissolved with appropriate stirring to prepare a hyaluronic acid solution. Complete dissolution of the hyaluronic acid was confirmed by visual observation.

A solution of 2.27 g of NHS in 15 mL of triple-distilled water was added to the stirred hyaluronic acid solution to prepare a hyaluronic acid-NHS solution. A solution of 3.79 g of EDC in 15 mL of triple-distilled water was added to the hyaluronic acid-NETS solution to prepare a hyaluronic acid-NHS-EDC solution. A solution of 3.00 g of dopamine in 15 mL of triple-distilled water was added to the hyaluronic acid-NHS-EDC solution to prepare a hyaluronic acid-NHS-EDC-dopamine solution. The reaction was carried out at room temperature for at least 5 h. After completion of the reaction, the reaction solution was dialyzed using a dialysis membrane (MWCO: 12,000-14,000, SpectraPor). The product was freeze-dried and stored.

2 mg of the resulting hyaluronic acid-catechol hemostatic sponge was dissolved in 1 mL of deionized water. The binding rate of catechol was confirmed using a UV-Vis spectrophotometer. As a result, the binding rate of catechol per hyaluronic acid molecule was found to be 4.3%.

Preparative Example 3: Synthesis of Chitosan-Catechol 300 mL of triple-distilled water was placed in a reactor and 3 g of chitosan, which has been previously divided into small portions, was added thereto. To the mixture was added 3 mL of a 5 M hydrochloric acid solution. The resulting mixture was dissolved with appropriate stirring and 8 mL of a 0.5 M sodium hydroxide solution was added thereto. The mixture was dissolved with appropriate stirring to prepare a chitosan solution. Complete dissolution of the chitosan was confirmed by visual observation.

A solution of 2.07 g of HCA in 10 mL of triple-distilled water was added to the stirred chitosan solution to prepare a chitosan-HCA solution. A solution of 1.77 g of EDC in 200 mL of ethanol was added to the chitosan-HCA solution. The reaction was carried out at room temperature for at least 1 h. After completion of the reaction, the reaction solution was dialyzed using a dialysis membrane (MWCO: 12,000-14, 000, SpectraPor). The product was freeze-dried and stored.

2 mg of the resulting chitosan-catechol hemostatic sponge was dissolved in 1 mL of deionized water. The binding rate of catechol was confirmed using a UV-Vis spectrophotometer. As a result, the binding rate of catechol per chitosan molecule was found to be 8.9%.

Preparative Example 4: Fabrication of Hemostatic Multilayer Sponge Having Gelatin Layer/Binding Layer/Chitosan-Catechol Layer Structure In this example, a hemostatic multilayer sponge as a hemostatic dressing was fabricated using gelatin as a porous matrix and the chitosan-catechol synthesized in Preparative Example 3 as a hemostatic layer.

The hemostatic layer of the hemostatic multilayer sponge was formed by the following procedure. First, 1 g of the freeze-dried chitosan-catechol synthesized in Preparative Example 3 was dissolved in 100 mL of triple-distilled water with stirring to prepare a hemostatic layer-forming solution. The viscosity of the solution was found to be 74.3 cP. After the solution was dispensed into a mold, gelatin (sponge-like absorbable polymer) as a porous matrix was placed on the dispensed solution such that the hemostatic layer-forming solution was appropriately impregnated into the gelatin, followed by freeze-drying.

The resulting hemostatic multilayer sponge consisted of a porous matrix layer including gelatin (bottom), a binding layer (middle), and a hemostatic layer including chitosan containing catechol moieties introduced therein (top).

Preparative Example 5: Fabrication of Hemostatic Multilayer Sponge Having Gelatin Layer/Binding Layer/Chitosan-Catechol Layer Structure A hemostatic multilayer sponge was fabricated in the same manner as in Preparative Example 4, except that 0.5 g of chitosan-catechol was dissolved in 100 mL of triple-distilled water to prepare a hemostatic layer-forming solution. The viscosity of the hemostatic layer-forming solution was found to be 25.7 cP.

Preparative Example 6: Fabrication of Hemostatic Multilayer Sponge Having Gelatin Layer/Binding Layer/Gelatin-Catechol Layer Structure A hemostatic multilayer sponge was fabricated in the same manner as in Preparative Example 4, except that 1 g of gelatin-catechol was dissolved in 100 mL of triple-distilled water to prepare a hemostatic layer-forming solution. The viscosity of the hemostatic layer-forming solution was found to be 14.6 cP.

Preparative Example 7: Fabrication of Hemostatic Multilayer Sponge Having Gelatin Layer/Binding Layer/Hyaluronic Acid-Catechol Layer Structure A hemostatic multilayer sponge was fabricated in the same manner as in Preparative Example 4, except that 1 g of hyaluronic acid-catechol was dissolved in 100 mL of triple-distilled water to prepare a hemostatic layer-forming solution. The viscosity of the hemostatic layer-forming solution was found to be 13.3 cP.

Preparative Example 8: Fabrication of Hemostatic Multilayer Sponge Having Gelatin Layer/Binding Layer/Chitosan-Catechol Layer Structure by Coating Process 1.5 g of the freeze-dried chitosan-catechol synthesized in Preparative Example 3 was dissolved in 100 mL of triple-distilled water with stirring to prepare a hemostatic layer-forming solution. The viscosity of the hemostatic layer-forming solution was found to be 745 cP. The chitosan-catechol solution was evenly applied to a gelatin layer, followed by freeze-drying to fabricate a hemostatic multilayer sponge.

Comparative Preparative Example 1: Fabrication of Hemostatic Multilayer Sponges Having Gelatin Layer/Binding Layer/Chitosan-Catechol Layer Structure Chitosan-catechol solutions having viscosity values in the range of 10 to 2,500 cP, as measured using a rotary viscometer at 4° C., were prepared as hemostatic layer-forming solutions. The hemostatic layer-forming solutions were used to fabricate hemostatic multilayer sponges having a multilayer structure. In the multilayer structure, a binding layer was well formed and the constituent layers were not separated from each other. In contrast, when a chitosan-catechol solution having a viscosity outside the range defined above was used, it was difficult to obtain a multilayer sponge having a stable structure.

FIG. 3 shows the structures of a hemostatic multilayer sponge fabricated by impregnating a chitosan-catechol solution having a low viscosity into a gelatin layer and a hemostatic multilayer sponge fabricated by impregnating a chitosan-catechol solution having a high viscosity into a gelatin layer. Referring to FIG. 3, when a chitosan-catechol solution having a viscosity of <10 cP was impregnated into a gelatin layer, an excessively large amount of the chitosan-catechol solution was absorbed into the gelatin layer, making it impossible to form a multilayer structure. Meanwhile, as shown in B of FIG. 3, when a chitosan-catechol solution having a viscosity of >2,500 cP, a binding layer was not formed, and as a result, a sufficient bonding strength was not obtained, resulting in separation between a gelatin layer and a chitosan-catechol layer. The viscosity of the solution used to fabricate the sponge shown in A of FIG. 3 was 8.3 cP. The viscosity of the solution used to fabricate the sponge shown in B of FIG. 3 was 2,717 cP.

Experimental Example 1: Observation of the Multilayer Sponge

In this experimental example, the cross-section of the multilayer sponge fabricated in Preparative Example 4 was observed using a scanning electron microscope at magnifications of 40× and 200×.

FIG. 4 shows the cross-sectional scanning electron microscopy images of the multilayer sponge. Referring to FIG. 4, the sponge had a trilayer structure consisting of a hemostatic layer (top), a binding layer (middle), and a porous matrix layer (bottom).

The binding layers of the multilayer sponges fabricated in Preparative Examples 4, 5, and 8 were measured to have thicknesses of 390±40 900±90 and 310±100 respectively.

Experimental Example 2: Measurement of Tensile Strengths of Sponges

In this experimental example, the tensile strengths of a gelatin sponge, a chitosan sponge, and the multilayer sponge fabricated in Preparative Example 4 were measured. First, each of the sponges was cut into a specimen having a width of 0.6 cm and a length of 0.5 cm. Then, both ends of the specimen were clamped to a universal testing machine. The specimen was pulled at a speed of 5.0 mm/min. The maximum force (N) when the specimen fractured was recorded. Experiments were independently performed in quintuplicate.

Table 1 shows the results of analyzing the strength characteristics of the sponges. Among the values obtained by the tests, the moduli of elasticity (slopes of the stress-strain curves) of the gelatin sponge and the chitosan sponge were 0.85 and 1.02, respectively. In contrast, the modulus of elasticity of the multilayer sponge was 1.71, which corresponds to 2.01 times that of the gelatin sponge and 1.68 times that of the chitosan sponge.

TABLE 1

| Strength characteristics | Gelatin sponge | Chitosan sponge | Multilayer sponge |
|---|---|---|---|
| Max load (N) | 3.98 | 1.51 | 3.88 |
| Tensile strain (%) | 4.17 | 1.68 | 2.05 |
| Tensile strength (N/mm$^2$) | 0.13 | 0.05 | 0.13 |
| Elastic modulus (N/mm$^2$) | 0.85 | 1.02 | 1.71 |

Experimental Example 3: Comparison of Sealing Forces of the Sponges

In this experimental example, the sealing forces of a gelatin sponge, a chitosan sponge, and the multilayer sponge fabricated in Preparative Example 4 were compared. First, a red dye solution was dropped onto the gelatin sponge, the chitosan sponge, and the multilayer sponge. The top and bottom surfaces of each sponge were observed.

FIG. 5 shows photographs revealing the results of analyzing the sealing properties of the hemostatic sponges. Referring to FIG. 5, the red dye solution was observed only on the bottom surfaces of the gelatin sponge and the multilayer sponge, indicating that the sponges had sealing forces. In contrast, the red dye solution permeated from the bottom surface to the top surface of the chitosan sponge, indicating that the chitosan sponge did not have a sealing force.

Experimental Example 4: Comparison of Adhesive Strengths to Porcine Colon Tissues In this experimental example, the adhesive strengths of a gelatin sponge, a chitosan sponge, and the multilayer sponge fabricated in Preparative Example 4 to tissues were compared. First, each sponge was cut to a size of 1.0×1.0 cm and rectangular colon tissues were prepared. After animal blood was dropped onto the colon tissues, the sponge (size 1.0×1.0 cm) was attached to the corresponding colon tissue. Then, both ends of the specimen were clamped to a universal testing machine. The tensile-shear strength (N) when the sponge was separated from the colon tissue was recorded. The adhesive strength (kPa) was calculated from the tensile-shear strength (N). Experiments were independently performed in triplicate.

Table 2 shows the adhesive strengths of the sponges to the blood-stained porcine colon tissues. The adhesive strength to the tissue increased in the order of gelatin sponge<chitosan sponge<multilayer sponge. Each experimental value is the mean±standard deviation.

TABLE 2

| Sponge | Adhesive strength (kPa) |
| --- | --- |
| Gelatin sponge | 5.23 ± 0.46 |
| Chitosan sponge | 11.80 ± 1.30 |
| Multilayer sponge | 16.93 ± 9.25 |

Experimental Example 5: Sealing and Adhesive Properties in Porcine Colon Tissues In this experimental example, the sealing and adhesive properties of a gelatin sponge, a chitosan sponge, and the multilayer sponge fabricated in Preparative Example 4 were analyzed. A bursting tester was used to analyze the sealing and adhesive properties of the sponges. Experiments were independently performed in triplicate.

A hole was formed in a porcine colon tissue using a 0.8 cm diameter punch and each of the gelatin sponge, the chitosan sponge, and the bilayer sponge was cut to a size of 2.0×2.0 cm and placed on the 8 mm diameter hole. The colon tissue on which the sponge was placed was located on the diaphragm of the bursting tester, air was blown into the bursting tester, and the pressure at which the sponge was separated from the colon tissue was recorded.

Table 3 shows the results of analyzing the sealing and adhesive properties. The gelatin sponge was easily peeled off from the tissue because its adhesive strength to the tissue was close to 0 hPa. Since the chitosan sponge did not have sealing force, air blown into the tester leaked through the pores of the sponge, making it impossible to measure the pressure. In contrast, since the multilayer sponge had both sealing force and adhesive strength to the tissue, its sealing-adhesive strength could be analyzed. The sealing-adhesive strength of the multilayer sponge to the porcine colon tissue was found to be an average of 37.8 hPa.

TABLE 3

| Sponge | Pressure (hPa) | Mean | Standard deviation |
| --- | --- | --- | --- |
| Chitosan sponge | ~0 | — | — |
|  | ~0 |  |  |
|  | ~0 |  |  |
| Gelatin sponge | ~0 | — | — |
|  | ~0 |  |  |
|  | ~0 |  |  |
| Multilayer sponge | 35.5 | 37.8 | 2.8 |
|  | 37.8 |  |  |
|  | 41.3 |  |  |

Experimental Example 6: User Convenience Comparison

In this experimental example, an evaluation was made as to whether a gelatin sponge, a chitosan sponge, and the multilayer sponge fabricated in Preparative Example 4 for use as hemostatic agents were non-adherent to surgical instruments and were adherent to living tissues taking into consideration the in vivo aqueous environment during surgery.

Each sponge was cut to a size of 1.0×1.0 cm, forceps were exposed to physiological saline, and a rectangular colon tissue was prepared. After the sponge (size 1.0×1.0 cm) was attached to the tissue with the forceps, it was confirmed whether the sponge was separated from the forceps. After the sponge was attached to the colon tissue in the same manner as described above, it was confirmed whether the sponge was separated from the tissue.

Table 4 shows whether each sponge was separated from the forceps exposed to physiological saline or the colon tissue after being attached to the forceps or the tissue. The gelatin sponge had poor adhesion to the instruments and the tissue and the chitosan sponge had good adhesion to the instruments and the tissue. In contrast, the surface of the multilayer sponge in contact with the instruments had poor adhesion to the instruments and the surface of the multilayer sponge in contact with the tissue had good adhesion to the tissue. In conclusion, the multilayer sponge was superior to the other sponges in terms of user convenience.

TABLE 4

| Sponge | Adhesion to instruments | Adhesion to tissue |
| --- | --- | --- |
| Gelatin sponge | Poor | Poor |
| Chitosan sponge | Good | Good |
| Multilayer sponge | Poor | Good |

Experimental Example 7: Hemostasis Performance in Rat Liver Hemorrhage Models In this experimental example, the hemostatic multilayer sponge fabricated in Preparative Example 4 was applied to rat liver hemorrhage models to evaluate its hemostatic performance.

9-week-old male Sprague Dawley rats were used as experimental animals. The animals were divided into two groups: a control group which was untreated after hemorrhage induction and an experimental group to which the gelatin sponge or the multilayer sponge was applied after hemorrhage induction.

After complete anesthesia of each rat was induced, the injection site was sterilized. After the abdomen was cut open, the liver was exposed and sprayed with sterile physiological saline to remove foreign matter. The center of the exposed liver was injured with a scalpel to induce hemorrhage.

As for the control group, no treatment was given for the injury-induced hemorrhage. In the experimental group, the gelatin sponge or the multilayer sponge was placed on the bleeding site.

3 min after hemorrhage induction, it was observed with the naked eye whether hemostasis was achieved. The results are shown in Table 5. Hemostasis was not observed in all animals in the control group and the experimental group using the gelatin sponge even after 3 min of bleeding. That is, the rate of hemostasis achieved within 3 min of bleeding was 0%. In contrast, hemostasis was observed in all animals in the experimental group using the multilayer sponge. That is, the rate of hemostasis achieved within 3 min of bleeding was 100%. These results concluded that the multilayer sponge is effective in stopping bleeding at the bleeding sites of the excised rat livers.

TABLE 5

| Group | Whether hemostasis was achieved within 3 min | Rate of hemostasis achieved (%) |
|---|---|---|
| Control group | x | 0 |
|  | x |  |
|  | x |  |
| Gelatin sponge | x | 0 |
|  | x |  |
|  | x |  |
| Multilayer sponge | o | 100 |
|  | o |  |
|  | o |  |

Experimental Example 8: Hemostatic Performance in Rat Carotid Artery Bleeding Models In this experimental example, the multilayer sponge fabricated in Preparative Example 4 was applied to rat carotid artery bleeding models to evaluate its hemostatic performance. Experiments were independently performed in triplicate.

9-week-old male Sprague Dawley rats were used as experimental animals. The animals were divided into two groups: a control group to which gauze was applied after hemorrhage induction and an experimental group to which the multilayer sponge was applied after hemorrhage induction.

After complete anesthesia of each rat was induced, the injection site was sterilized. The middle area from below the jaw to the chest of the rat was incised about 3 cm and bleeding from the carotid artery was induced using a 31 G needle.

In each animal in the control group, the bleeding site was covered with gauze for compression hemostasis. In each animal in the experimental group, the bleeding site was covered with the multilayer sponge and gauze folded together for compression hemostasis. After 2 min, the gauze or the multilayer sponge folded with gauze was carefully removed so as not to damage the clots at the hemostasis site and it was confirmed with the naked eye whether hemostasis was achieved.

2 min after hemorrhage, it was observed with the naked eye whether hemostasis was achieved. The results are shown in Table 6. Hemostasis was not observed within 2 min after hemorrhage in all animals in the control group using gauze for compression hemostasis. In contrast, hemostasis was observed within 2 min after hemorrhage in all animals in the experimental group using the multilayer sponge. That is, the rate of hemostasis achieved within 2 min of bleeding was 100%. These results concluded that the multilayer sponge is effective in stopping bleeding at the carotid artery bleeding sites of the rats.

TABLE 6

| Group | Weight (g) | Whether hemostasis was achieved within 2 min | Rate of hemostasis achieved (%) |
|---|---|---|---|
| Control | 307 | x | 0 |
|  | 313 | x |  |
|  | 315 | x |  |
| Multilayer sponge | 316 | o | 100 |
|  | 312 | o |  |
|  | 315 | o |  |

Experimental Example 9: Evaluation of Cytotoxicity and Intradermal Reaction of the Multilayer Sponge In this experimental example, the cytotoxicity and intradermal reaction of the multilayer sponge fabricated in Preparative Example 4 were evaluated.

Cytotoxicity was tested by an indirect method. First, 2.0% agar and 2xMEM were mixed in a 1:1 ratio. The mixture was overlaid on mouse-derived cells L929 and the multilayer sponge cut to a size of 1.0×1.0 cm was placed thereon. Cells were cultured in an incubator set at 5% $CO_2$ and 37±1° C. in a saturated vapor state. After 48-h culture, the morphology of the cells was observed using an upright microscope. About 2 mL of neutral red was added and incubation was performed in the incubator for 15-30 min. After removal of the neutral red, cells were washed with PBS. It was confirmed whether cells were discolored.

Intradermal reaction was tested as follows. First, 3 healthy New Zealand White rabbits weighing 2.0 kg or more were selected and the hair on the back of each animal was shaved. 0.2 mL of an extract from each sponge was intradermally injected into the animal. The incidence of adverse reactions such as erythema and edema at the injection site was observed.

Table 7 shows the results of the cytotoxicity and intradermal reaction tests. The cytotoxicity test revealed that slightly deformed or degenerated cells were observed just below the gelatin sponge and the multilayer sponge and limited cell deformation and discoloration were observed just below the chitosan sponge. From these results, it could be determined that the cytotoxicities of all sponges were insignificant. The intradermal reaction test revealed that the extracts of all sponges caused no adverse reactions such as erythema and edema when injected intradermally. Therefore, the sponges are determined as materials that cause no intradermal reaction.

TABLE 7

| Sponge | Cytotoxicity | Intradermal reaction |
|---|---|---|
| Gelatin sponge | Suitable | Suitable |
| Chitosan sponge | Suitable | Suitable |
| Multilayer sponge | Suitable | Suitable |

The invention claimed is:

1. A hemostatic dressing comprising:
a porous matrix layer comprising a biocompatible polymer;
a hemostatic layer loaded on the porous matrix layer and comprising a polymer in which moieties containing a benzene ring having one or more hydroxyl groups are introduced; and
a binding layer interposed between the porous matrix layer and the hemostatic layer to prevent the porous matrix layer from being separated from the hemostatic layer,
wherein the binding layer is formed using a material that is miscible with the porous matrix layer and the hemostatic layer.

2. The hemostatic dressing according to claim 1, wherein the biocompatible polymer is a natural or synthetic biodegradable polymer.

3. The hemostatic dressing according to claim 1, wherein the porous matrix layer is a gelatin or collagen pad.

4. The hemostatic dressing according to claim 1, wherein the polymer of the hemostatic layer comprises phenol- or polyhydric phenol-containing moieties introduced therein.

5. The hemostatic dressing according to claim 4, wherein the polymer is a biocompatible polymer.

6. The hemostatic dressing according to claim 4, wherein each of the phenol- or polyhydric phenol-containing moieties is represented by "phenol-L-" or "polyhydric phenol-L-" where L is a single bond, a $C_1$-$C_{10}$ aliphatic hydrocarbon chain optionally containing —O—, —S—, —NH—, —C(O)—, —C(O)O—, —OC(O)O— or —C(O)NH— or a $C_3$-$C_{10}$ alicyclic hydrocarbon chain optionally containing —O—, —S—, —NH—, —C(O)—, —C(O)O—, —OC(O)O— or —C(O)NH—.

7. The hemostatic dressing according to claim 1, wherein the hemostatic layer comprises both benzene rings having —OH and benzene rings having =O.

8. The hemostatic dressing according to claim 1, wherein the material is a blend or a copolymer of the major constituent component of the porous matrix layer and the major constituent component of the hemostatic layer.

9. The hemostatic dressing according to claim 4, wherein the binding layer comprises a mixed region of the biocompatible polymer and the polymer comprising the phenol- or polyhydric phenol-containing moieties introduced therein.

* * * * *